United States Patent [19]
Missioux

[11] 4,040,509
[45] Aug. 9, 1977

[54] AUTONOMOUS GROUP FOR MECHANICAL CONTROL OF MACHINES

[76] Inventor: Jean Leon Missioux, 55 Boulevard Gambetta, 95 Sannois, France

[21] Appl. No.: 634,628

[22] Filed: Nov. 24, 1975

[30] Foreign Application Priority Data

Dec. 4, 1974  France .................................. 74.39588

[51] Int. Cl.² ..................... F16D 71/00; B65H 25/14; B65H 25/32
[52] U.S. Cl. ...................................... 192/150; 74/54; 200/61.18
[58] Field of Search ........................... 192/150; 74/54; 200/61.18; 340/259

[56] References Cited
U.S. PATENT DOCUMENTS

| 52,670 | 2/1866 | Briggs ...................................... 74/54 |
| 404,651 | 6/1889 | Paca ............................ 200/DIG. 11 |
| 1,984,641 | 12/1934 | Hargreaves ............................... 74/54 |
| 2,305,391 | 12/1942 | Rosenmund ...................... 192/150 X |
| 2,457,281 | 12/1948 | Shannon ............................... 74/54 X |
| 2,649,863 | 8/1953 | Francis et al. ......................... 74/54 X |
| 3,044,052 | 7/1962 | Marsh ............................ 200/61.18 X |
| 3,092,696 | 6/1963 | Wallace ............................... 200/61.18 |

FOREIGN PATENT DOCUMENTS

| 341,022 | 1/1931 | United Kingdom ..................... 74/54 |
| 875,508 | 8/1961 | United Kingdom ................. 192/150 |

*Primary Examiner*—Allan D. Herrmann
*Attorney, Agent, or Firm*—Cameron, Kerkam, Sutton, Stowell & Stowell

[57] ABSTRACT

Motor rotated cams each actuate a lever and each lever is connected by a flexible non-extensible member, cable or chain, to the element of the machine to be controlled. A spring loaded bell crank lever is provided for each flexible non-extensible member and the non-extensible member passes over a pulley mounted at one end of an arm of the bell crank lever. Each arm of the bell crank lever actuates an electric switch connected to a motor whereby if the tension in the flexible non-extensible member increases or decreases excessively the appropriate one of the switches is opened to stop the motor.

7 Claims, 6 Drawing Figures

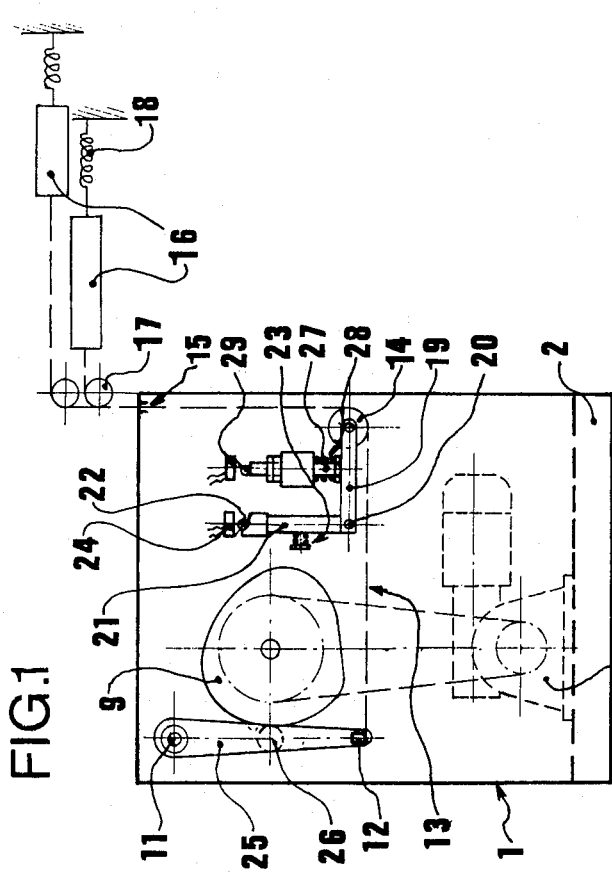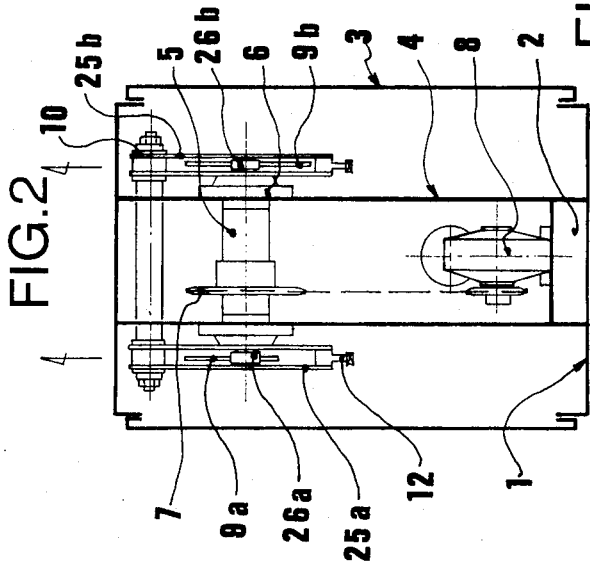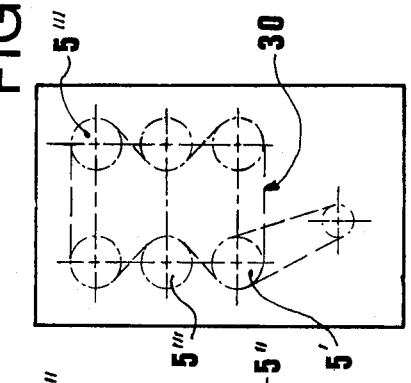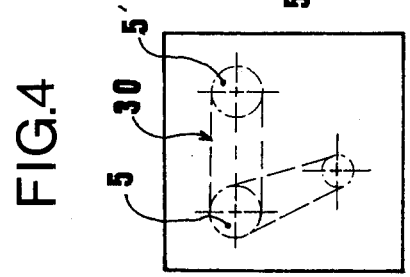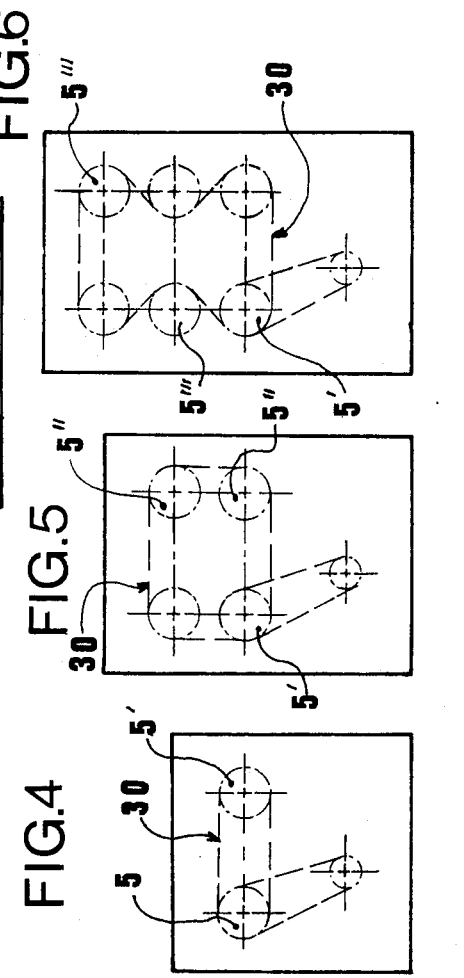

AUTONOMOUS GROUP FOR MECHANICAL CONTROL OF MACHINES

BACKGROUND OF THE INVENTION

In automatic cycling machines presently utilized it is known that the various movements of screws, tools and other movable elements are generally controlled by a cam shaft driven by a motor with these driving arrangements being a part of the machine. It follows that to modify the action of a tool or of a movable piece of the machine involves disconnecting the group motor and change of the cam shaft or of the cams to provide a new driving movement for the tool in accordance with the frequency and amplitude desired. This involves a consequent shutdown of the machine and a long and costly job which is also the case when a simple takedown of the machine is to be carried out.

In the particular case of cycling hydraulic machines a control group has already been suggested in which the hydraulic motor, installed in series in the pressure fluid circuit, controls a cam drum which acts on electric contacts to actuate electric valves controlling jacks as described in applicant's French Pat. No. 1,480,324.

Hydraulic groups are also known for automatic cycling machines which utilize a transmission system through hydraulic couplings as described in applicant's French Pat. No. 1,565,690.

These known arrangements are, however, difficult to use in mechanical structures and machine tools where it is necessary to have a mechanical control of various moving elements without requiring costly structures, which are delicate and difficult to interchange such as hydraulical control circuits with electric valves. For this reason, the present autonomous group for mechanical control of machines has been conceived in which modifications and simple transformations can be readily and rapidly made for the most diverse machines, not possessing an autonomous motor group, in the utilization of the control group.

SUMMARY OF THE INVENTION

In accordance with the present invention a tranmission group for the mechanization of various machines is an independent assembly having at least one rotating shaft on which are mounted a plurality of cams each acting on a pivoting lever, which levers cyclically transmit their displacement movements by cables or chains to the machines.

In accordance with a particular characteristic of the present invention, the cams are all accessible through ports or access openings provided in the housing of the transmission group and are easily interchangeable.

In accordance with another characteristic of the invention the tension of the cables or chains driven by the levers is provided by a bell crank system and pulley to provide a double safety in case of locking of an element of the machine or of the control group itself.

In accordance with an embodiment of the invention the independent assembly is made up of the transmission group including a driving motor connected to a rotating shaft to form an autonomous transmisson group.

REFERENCE TO THE ACCOMPANYING DRAWINGS

Other particular characteristics and advantages of the present invention will appear from the following description of preferred embodiments thereof described by way of example and not by way of limitation with respect to the accompanying drawings in which:

FIG. 1 is a vertical sectional view of a transmission group with autonomous functions;

FIG. 2 is a lateral elevation view of FIG. 1;

FIG. 3 is a top view of FIG. 1; and

FIGS. 4, 5 and 6 are schematic views of various modifications of the structure of FIG. 1.

The autonomous group shown in FIGS. 1, 2 and 3 has a rectangular housing 1 provided with a bottom 2 and lateral walls 3 which are easily demountable and which thus provides simple access openings. Rectangular housing 1 is interiorlyreinforced by two vertical plates 4 which support the elements making up the group and are provided to this end with suitable openings. These plates are further immovable on the sides of the support base. On the upper part of plates 4 is mounted a shaft 5 in bearing 6 and the shaft between the two vertical plates is fixed a driving sprocket 7 connected by a chain to the group motor speed or speed reducer mounted on bottom 2 of the housing and provided with means for varying the speed of the motor. Two cams 9a and 9b are fixed to the ends of shaft 5 by well means of keys and nuts 10 making them easily demountable. A lever made up of two vertical side plates 25 pivots around a horizontal axis 11 mounted in the upper part of support plates 4. It will be noted that the levers 25a or 25b are disposed one on either side of plates 4 and pivot independently of each other. Cam followers 26a and 26b are mounted between the side plates 25a and 25b adjacent cam shaft 5, substantially in the middle of lever 25, in such a manner as to be actuated by cams 9a and 9b and thus transmit to the levers the transverse movements provided by the cams.

At the lower end of levers 25 between the plates is mounted a fitting 12 receiving the non-extensible flexible members, chains or cables 13 which transmit the movements of the cams to the exterior of the motor group. Chains or cables 13 have a first flight over toothed wheels or pulleys 14 within the autonomous control group. Chains 13 leave through openings 15 in the housing and are connected to the tools to be actuated as schematically seen at 16 after passing over pulleys 17 with return springs 18 providing tension and return of chains or cables 13. These springs can be replaced if required by appropriate pneumatic systems 18'.

As seen in FIG. 1, the toothed wheel or pulley 14 is mounted at the end of a bell crank lever 19, 21 articulated on axis 20, with arm 21 pivoting slightly around axis 22 against the action of compression spring 23. An electric switch 24 mounted at the end of arm 21 opens upon displacement of arm 21. This provides a safety feature in case of abnormally low tension of the chain or cable 13 when spring 23 then moves arm 21 toward the right which results in opening of the switch. The other arm of bell crank 19 engages against a sliding rod 27 provided with a return spring 28 which acts on an electric switch 29. This second electric switch is another safety feature in case of abnormal and excess tension in the chain or cable 13 as for example, if there is a blocking of an element of the machine 16. Such an excess tension causes the pivoting of arm 19 around pivot 20 which compresses spring 28. When the tension of the chain or cable passes a normal tension switch 29 is opened and stops rotation of the cams. With this construction there is a double safety feature which is very efficient and easily accessible for replacement and adjustment.

It is easily seen that this autonomous control group can mechanize various machines since each cam 9a, 9b is accessible through openings 3 and is easily interchangeable. Shaft 5 can thus have two cams each entirely different from the other each acting independently on control levers 25. The cycles and the amplitude of the movements caused by the two cams driven by the same shaft can thus provide different operations.

In certain cases it is desirable to multiply the machine outputs and the present invention includes control groups with a plurality of shafts as shown schematically in FIGS. 4 to 6. In FIG. 4, the motor group drives a first shaft 5 which carries two cams, as above described, but a drive chain or cable 30 transmits this movement of rotation to a second shaft 5' which also carries two driving cams. A control group is thus provided with four machine outputs.

FIG. 5 shows a group with eight outputs, shaft 5 being connected by a circular chain or cable 30 to three other shafts 5", which rotates in the same direction.

In the embodiment of FIG. 6, shaft drives through chain or cable 30, five other shafts 5''' with the arrangement of the chain being such that, as shown, the shafts are rotated in different directions which is an advantage in certain particular uses. This embodiment provides twelve machine outputs.

It should be noted that the rectangular housing enclosing the driving group as well as the vertical plates supporting the shafts can be arranged to receive this pluarlity of cam shafts for at least two possible types of mounting. This further reduces the cost of fabrication and provides great flexibility in use.

The present invention is not limited to the several embodiments discussed above but also includes a transmission group not utilizing motor 8 in the independent assembly as described, rotation of cam shaft 5 being provided, for example, by a moving part of a machine which is to modernized. Thus the motor for the machine will not only be used to drive the machine but also as a source of energy for other machines. The transmission group can then be properly located and cam shaft 5 connected to the motor for the machine.

What I claim is:

1. Transmission group for mechanical control of machines comprising an independent assembly including at least one rotating shaft, at least two cams removably mounted on said shaft, a pivoted lever engaging each of said cams, a non-extensible flexible member connected to each of said levers and to the machine to be controlled outside of the group, said non-extensible flexible members transmitting the cyclical movement of said cams to themachines to be controlled, security means reacting to variations of tension in said non-extensible flexible members to stop the control group upon occurrence of an excessible variation of tension in said non-extensible flexible members between said levers and the machines to be controlled, a housing for the independent transmission group, a driving motor in said housing rotating said shaft, a base for the transmission group, said housing including at least two walls removably mounted on said base and disposed opposite each other and two vertical spaced parallel plates within said walls and secured to said base, said two vertical walls supporting said shaft, said shaft extending across said base.

2. A transmission group as described in claim 1, said cams being secured to said shaft by keys and nuts and adjacent said vertical plates.

3. A transmission group as described in claim 1, including a driving sprocket on said shaft between said vertical plates and driving means connecting said pinion to said motor.

4. Transmission group as described in claim 1, each of said levers including two vertical spaced plates independently pivoted on a horizontal axis and mounted adjacent an upper part of said vertical plates and cam followers mounted between said vertical plates and at the level of said shaft for engagement by said cams.

5. A transmission group as described in claim 1, including spring means applying tension to said non-extensible flexible members.

6. A transmission group as described in claim 1, said security means including for each of said non-extensible flexible members a bell crank lever, a first and a second arm for said bell crank lever, a pulley mounted for rotation at an end of the first of said arms, said non-extensible flexible member passing over said pulley, said first bell crank arm supporting said pulley rotating against a spring, a first electric switch actuated by said first bell crank arm upon the occurrence of a loss of tension in said non-extensible flexible member to open said switch, said second of said bell crank arms acting against a spring, a second electric switch for said second bell crank arm, said second bell crank arm opening said second electric switch upon the occurence of excessive tension in said non-extensible flexible member.

7. A transmission group as described in claim 1, including a plurality of said shafts and driving means between said motor and said plurality of said shafts.

* * * * *